June 17, 1930.  A. H. G. FOKKER ET AL  1,765,328
AMPHIBIAN AIRCRAFT
Filed Sept. 27, 1928   3 Sheets-Sheet 2
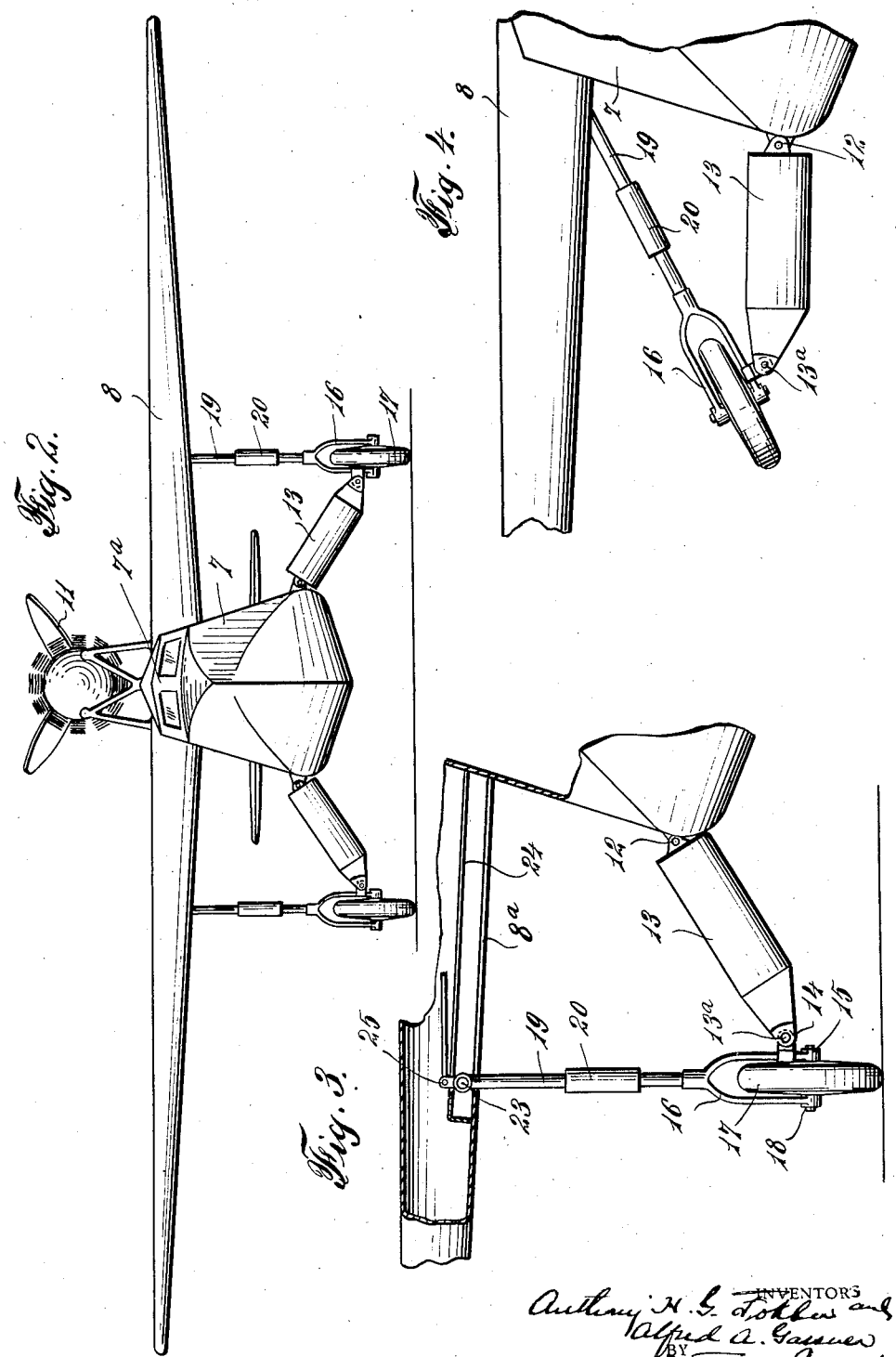

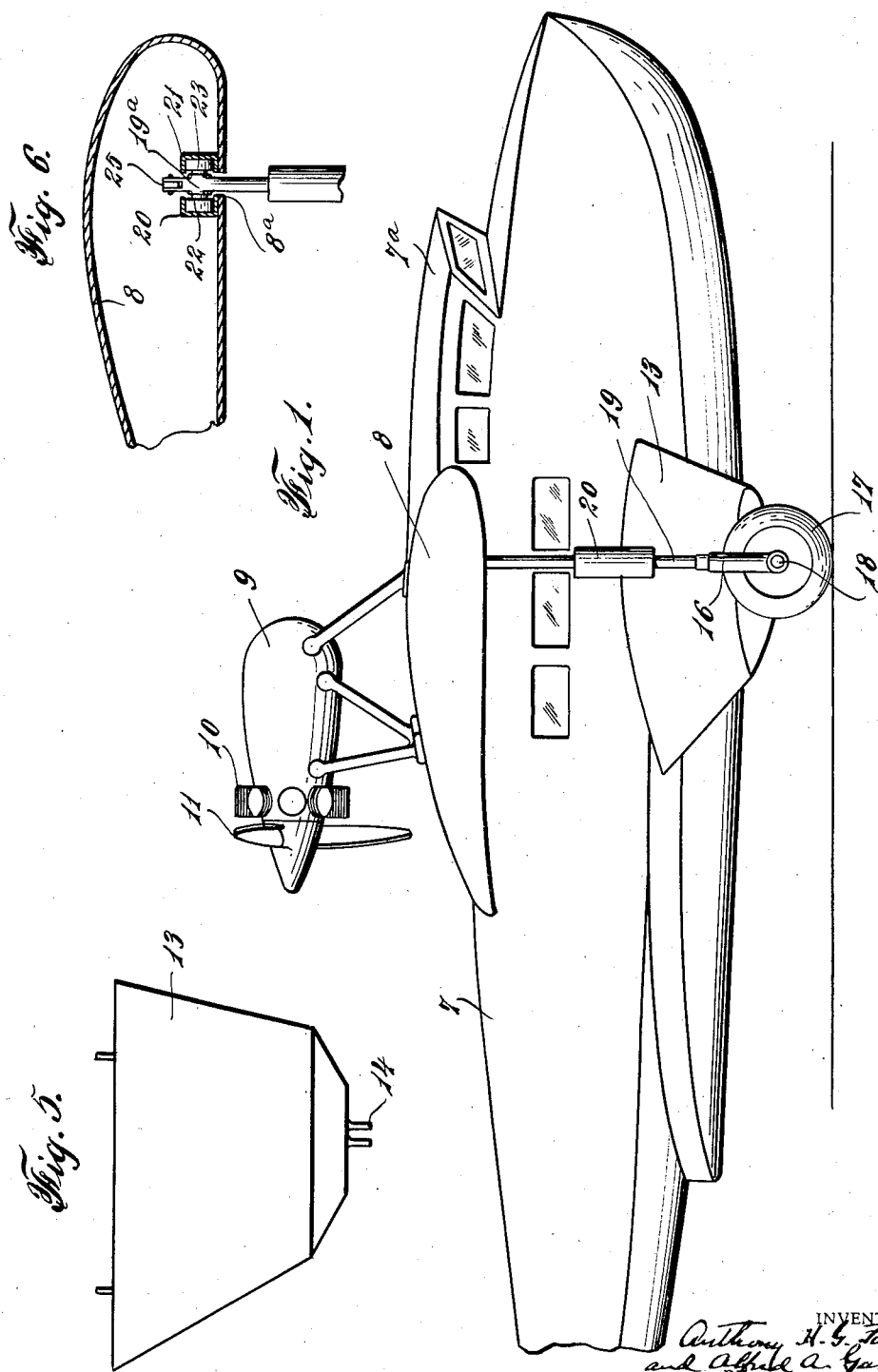

June 17, 1930.  A. H. G. FOKKER ET AL  1,765,328
AMPHIBIAN AIRCRAFT
Filed Sept. 27, 1928   3 Sheets-Sheet 3
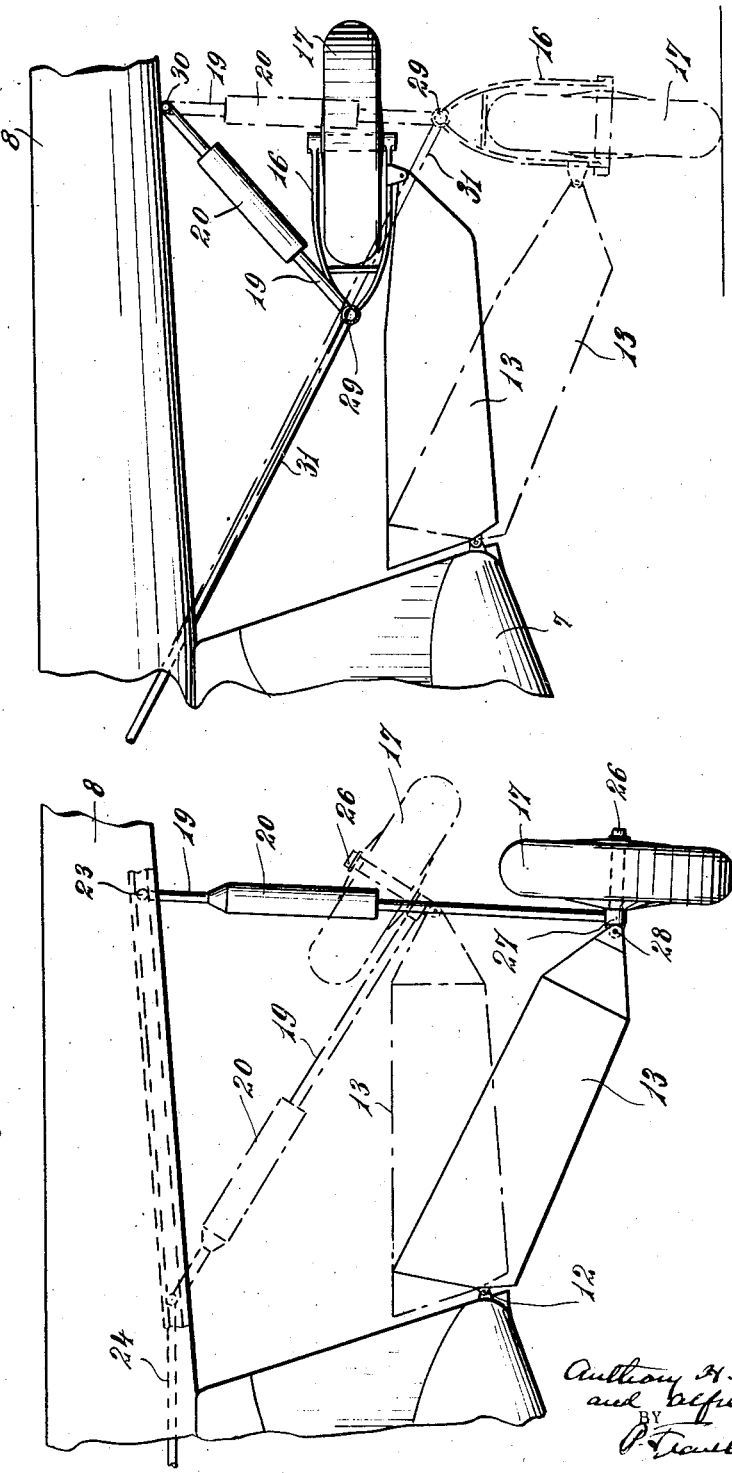

Patented June 17, 1930

1,765,328

UNITED STATES PATENT OFFICE

ANTHONY H. G. FOKKER, OF TENAFLY, NEW JERSEY, AND ALFRED A. GASSNER, OF NEW YORK, N. Y., ASSIGNORS TO FOKKER AIRCRAFT CORPORATION OF AMERICA, A CORPORATION OF DELAWARE

AMPHIBIAN AIRCRAFT

Application filed September 27, 1928. Serial No. 308,812.

This invention relates generally to aircraft and is more particularly directed to improvements in craft of the heavier-than-air types, especially those so-called dual-purpose airplanes, designed for taking off from or alighting on land or water, which are commonly termed amphibians.

As is well known, the so-called amphibians embody a hull with one or more airfoils or wings, together with a supporting structure which includes wheels for use in taking off from and landing upon the ground. The hull constitutes the main support of the craft, when it is at rest on, or when it is alighting upon, or traveling on water, suitable buoyant members or floats being carried on outrigging, or otherwise, to compensate for the overhanging weight of the wing, or wings, and to afford lateral stability to the craft, when so supported.

To support the airplane from the ground, without injury to the hull or floats, the ground landing gear, obviously, must be suitably braced fore and aft as well as laterally, while at the same time, it must be of a relatively light construction and capable of being withdrawn from its functioning position to prevent damage thereto, when the craft is alighting upon or traversing water. Various methods of folding or retracting the landing gear have been employed, the wheels and their supporting struts or elements being usually withdrawn or raised into the hull. Where the landing gear is raised within the hull, the plan most generally followed in the construction of amphibians, suitable pockets must be provided for the housed members. These pockets not only require valuable space within the hull, which should be available for cargo or other useful load, but, together with the more or less complicated mechanisms which must be employed for retracting and extending the landing gear, they present many difficulties in construction, among which is the important problem of maintaining the hull watertight. Further, due to the necessity for a compact structure, the effective leverage which may be obtained in any of the existing foldable or retractible landing gear constructions for withdrawing them into the hull is extremely limited, so that a considerable burden is imposed upon the pilot or the person whose duty it is to raise and lower the landing gear.

Therefore, the primary object of this invention is to improve and simplify the construction and operation of airplanes generally and especially aircraft of the aforesaid dual-purpose types.

More specifically, it is the object of this invention to provide a practical and simple form of landing gear for amphibian aircraft, which will overcome the disadvantages inherent to existing structures, as heretofore pointed out, thereby permitting of a more extensive use of such dual-purpose aircraft, than is now possible with the limitations imposed by the difficulties and short-comings of present methods of constructions.

It is also an object of this invention, to provide landing equipment or appurtenances for an amphibian or dual-purpose airplane, as aforesaid, in which the elements adapted to contact with the ground, when the craft is making a landing, or otherwise, may be readily actuated or moved to a non-functioning position, with a minimum of manual effort on the part of the pilot or other member of the crew of the ship.

Another object of this invention is to render available the maximum load space afforded by the hull design, by eliminating therefrom all interior obstructions, such as wheel-housing pockets or chambers, raising and lowering mechanisms for the landing gear and the like, the ground traversing elements and the supporting media therefor, being wholly disposed without the hull at all times.

The invention also contemplates the utilization of the means whereby lateral stability of the craft when on the water is obtained, as an element, or elements, of the undercarriage or chassis, which functions to support the aircraft when on the ground or when making a ground landing, such means being adaptable to contribute lift in a sufficient degree or ratio to negative or offset the resistance of the parasite members of the undercarriage structure, when the ship is in the air.

Other objects and additional advantages flowing from the practicing of our invention will present themselves as the description proceeds, and we would have it clearly understood that we reserve unto ourselves all rights to the full range of equivalents, both in structure and in use, to which we may be entitled under our invention in its broadest aspect.

Briefly stated, this invention is directed to the provision of an undercarriage structure, especially applicable to the requirements of dual-purpose aircraft, as amphibians, in which, in so far as it is possible, elements which are essential to the operation of the craft in the air, or when on the ground or upon the water, are conjointly utilized to form components of the undercarriage structure. By this means, the number of parts forming the structure are held to a minimum, with better performance characteristics than would be obtainable in a craft of the same general design, embodying a retractible landing gear of any of the present constructions.

For instance, it has been found that outboard floats rigged to the hull or to the wing surface adjacent the water, when the craft is supported in the latter element, are essential to counteract the unbalancing effect of the overhang of the wing and provide the required lateral stability. This has been their sole function. They contribute nothing to the operation of the craft when in the air. Likewise, when the craft is traversing the ground, or at rest thereon, they have no value as a supporting media. Rather, these floats are a potential source of trouble in handling and maneuvering the craft upon the ground, due to their vulnerability and their exposed or unprotected location, combined with the small ground clearance which usually prevails in existing structures.

In the present invention, the floats, in addition to performing their usual functions, become components of the landing gear or undercarriage structure, thereby eliminating many parts which must go into landing gears for amphibians, as now constituted, and simultaneously serving to provide an undercarriage which will more successfully resist the detrimental forces to which such structures are subjected, when in use. Further, by incorporating the floats as elements of the undercarriage, in accordance with this invention, they are less susceptible to injury when the craft is on the ground, than under present conditions, and may have movement relatively to the hull or to the supporting surface, or surfaces, as control surfaces, either in the air, or when the craft is on the water. If desired, it is feasible, with the use of our invention, to counteract the drag of the parasite parts of the undercarriage structure, in part, if not in toto, by imparting an airfoil section to the floats, which will then contribute to the lift in the manner of stub wings.

We will now proceed to describe our invention with reference to the accompanying drawings, wherein we have elected to show certain preferred embodiments thereof. However, it will be understood, that in making this election, it is done for illustrative purposes only and is not to be interpreted or construed as a limitation of our invention, which may be practiced in other ways, within the purview of the appended claims.

In the drawings:

Figure 1 is a side elevation of an airplane of the so-called amphibian type, embodying our invention in a preferred and practical form, a part of the tail being broken away.

Figure 2 is a front elevation of the structure shown in Figure 1.

Figure 3 is a fragmentary view, partly in section, showing the relative positions of the parts, when the landing gear is in position to support the craft from the ground.

Figure 4 is a view in elevation of a part of the structure illustrated in Figure 2, showing the positions which the interconnected parts of the landing gear will assume when the airplane is to be supported from the water.

Figure 5 is a plan view of one of the floats, shown in the preceding figures.

Figure 6 is a transverse section of a fragment of the wing or airfoil of the craft shown in Figure 1, illustrating a means of providing for the movement of the upper end of the vertical or shock absorbing strut, within the wing.

Figure 7 is a fragmentary view, in elevation, of a modified structure, in which the landing gear is shown in each of its two positions, and Figure 8 is a view similar to Figure 7, illustrating a further modification of the invention.

Referring now to the drawings in detail, in which like characters of reference are employed to designate similar parts in the several views, and more particularly to the structure shown in Figures 1 to 6, inclusive, 7 indicates the hull, which may be of the usual boat design, followed in the construction of so-called flying boats and amphibians, and which embodies a cabin or space for cargo and a pilot's compartment or cockpit, enclosed as at 7ª.

The wing 8 is of the thick or cantilever type and is connected across the top of the hull, a suitable mounting 9 being located on the center section thereof, for the engine 10, which drives the pusher-propeller 11. Any preferred form of mounting may be employed and the motor may be water-cooled or air-cooled. Likewise, a propeller of a design other than that illustrated may be used and in lieu of a single motor, the craft may be driven by two or more engines, mounted on the wing or elsewhere.

Disposed on each side of the hull 7 and connected thereto along its inner edge or end for relative movement on an axis parallel to the longitudinal axis of the hull, as by a hinge joint 12, is a float or buoyant member 13. This float may be of any preferred construction, size and configuration. For instance, it may be suitably streamlined, the fore and aft edges tapering toward the outer end, as clearly shown in Figures 1 and 5, or it may be of a special airfoil section design, to contribute lift when the airplane is in flight. In some cases, it might be found to be desirable to use the float as a storage reservoir for fuel or lubricating oils, in which event the proper provision may be made for filling and unloading the float-tank. Again, fuel or lubricating oil may be drawn directly to the power plant of the craft from the float-tank, through the medium of flexible tubing or other suitable connection, the functioning of which would not be affected by the movement of the float relative to the hull.

As will be observed, the outer end of the float 13, is provided with a fitting embodying ears or lugs 14, whereby a pivotal or hinged connection, as indicated at 13$^a$, may be made to a cooperating fitting 15 fixed to or integral with one arm of the forked or bifurcated member 16 within which the wheel 17 is mounted for rotation on its axle 18 in the customary manner. This forked or bifurcated member 16, is carried at the lower end, and forms a physical continuation of, the strut 19, which may consist of telescoping members whose relative movement is controlled by suitable yielding means, as a shock absorber of the hydraulic or other type, generally indicated at 20. Obviously, any of the rubber cord or other shock absorbers of standard or special design, such as are used on so-called land planes, which are adaptable to the purposes of our invention, may be employed. Also, the strut 19 may be of other construction than described, it being preferred, however, that it be streamlined or covered by a suitably streamlined fairing.

From the description thus far given, it will be noted that the float 13 forms a connection between the hull and the lower end of the strut 19, the float being movable relatively to the hull on the axis 12, while the forked members 16, or lower end of the strut 19, and said float are capable of relative movement on the outer axis 13$^a$.

The upper or head end of the strut 19 is movable longitudinally of the wing 8, within the slot 8$^a$ formed in the under surface thereof, as will be apparent from Figure 3 of the drawings. Located within the wing, in juxtaposition to said slot 8$^a$, we provide the spaced channel members 20 and 21, which form guideways and retainers for the rollers 22 and 23 respectively, mounted on a shaft journaled in suitable bearings in or attached to the upper end of said strut 19, as indicated at 19$^a$. Obviously, member of other cross-section than that shown, may be employed as rails or guides for said rollers, or in lieu of the rollers 22 and 23, two pair of rollers may be used, one roller being superposed above the other on each side of the head, with a rail of flat stock or of an I section positioned between each pair of rollers.

For effecting the movement of said strut within the slot 8$^a$, a cable or rod is operated from within the hull or wing, or at such other point as may be convenient, such cable or rod, indicated at 24, being connected to the upper end of the strut 19, as by a pin and clevis, as shown at 25 in Figure 6. From this, it will be seen that as the cable is put under tension, as by pulling upon from within the ship, the head or top of the strut 19 will be caused to move inwardly, or toward the hull, the rollers 22 and 23 riding on the guide rails 20 and 21. This will cause the strut 19 to cant or become inclined on its pivotal connection 13$^a$, with the float 13, the continued inward movement of the head of said strut reducing the angle between the float and the hull until the longitudinal axis of the former is substantially at an angle of 90° to the vertical axis of the latter. In other words, the inward movement of the head of the strut 19, by reason of the latter's pivotal connection with the outer end of the float 13, effects the movement of the float from its lower or downwardly inclined position, as shown in Figure 3, wherein it functions as a lateral and fore and aft tie between the wheel-carrying strut 19 and the hull, effectively bracing the wheel and the strut 19 against detrimental side loads and fore and aft impacts to which the undercarriage structure is subjected when making a landing on a solid surface, such as the ground, to its upper position, wherein it functions in the usual and intended manner of such devices. From Figure 4, it will be evident that when the float 13 is raised to a position substantially parallel to the transverse axis of the hull, the wheel 17 is supported in an inclined position from the outer end of the float with sufficient clearance from the water to protect it from such injury as might result were it completely submerged, or even partly so, during the time in which the craft is resting upon or traveling upon the water.

In the structure shown in Figure 7, in lieu of locating the wheel 17 within a bifurcated support 16, it is mounted on an axle 26 carried by a fitting 27 at the lower end of the strut 19, which in turn is hinged, as at 28, to the outer end of the float 13. The mounting of the head end of the strut 19 and its movement within the wing are accomplished in the manner described with respect to the preceding figures, the relative positions of the several components of the undercarriage structure, both in the functioning and non-functioning of the wheels as a supporting media, is clearly shown by the full and dot-and-dash lines of said figure.

For the rigid connection between the forked member 16 and the strut 19, as in the embodiment shown in Figures 1 to 6, inclusive, we substitute, in the modification illustrated in Figure 8, a pivotal connection 29, the upper end of said strut 19, instead of being bodily movable within a slot in the underside of the wing, being pivotally connected to the latter, as at 30. Therefore, when the strut 31, which, likewise, is connected to the aforesaid movable joint 29, and acts as a diagonal bracing member when the undercarriage is extended to function for a ground landing, is moved on its longitudinal axis, as into the wing, relative movement of the several components of the structure is effected on the pivotal connections 13$^a$, 29 and 30, resulting in the raising of the float 13 to the position in which it functions when the craft is supported on the water. As will be noted from the drawing, when the float 13 is thus raised the wheel 17 will be disposed in a substantially horizontal plane thereupon, the two positions which the undercarriage structure assumes in functioning, being clearly shown in the full and dot-and-dash lines of said Figure 8.

Manifestly, suitable means of connection between the hull and the floats 13 may be provided whereby the floats may be moved or rocked on their transverse axes to change their angle of approach and vary their stabilizing characteristics, in such degree as operating conditions might require. Also, the wheel 17 may be supported on an axle member rigid with the float, the lower end of the strut 19, in such event, being hinged or pivoted to the float, while the head will be movably supported as heretofore described.

As will be evident from the foregoing, an undercarriage embodying our invention, the strut 19, which may be termed a compression member, will not only yieldably resist and cushion the upward movement of the wheel 17 in response to landing impacts, when said strut is in a substantially vertical plane, but will also similarly serve to cushion and dissipate impacts received by the floats when the craft is alighting on the surface of the water and when the strut is in the oblique position which it takes when the float functions as a stabilizer. It will be understood that in either of the two positions which the strut assumes, the head is rigidly held or locked against movement, except in response to the will of the operator of the craft. Various means may be utilized for accomplishing this, either at the head of the strut or at a point remote therefrom.

While we have described our invention more or less specifically with relation to the embodiments illustrated, it will be obvious, as previously pointed out, that various changes in the details of structure and in the arrangement and cooperation of the several parts or components of the same may be made, to attain the objects hereinbefore set forth and within the spirit and scope of our invention.

What is claimed is:

1. An airplane of the amphibian type, comprising a hull, a wing associated therewith, means connected to the hull and variably adjustable relatively thereto for imparting lateral stability to the craft when on the water, wheels for supporting the airplane from the ground, means connecting said wheels to the wing, said latter means being yieldable in response to landing impacts, and movable means of connection between said lateral stabilizing means and said wheels.

2. An airplane having a hull, a wing associated therewith, and means connected to said hull and operable at will to function as an undercarriage for rising from or alighting on land or to impart lateral stability to the craft when on the water, said means including floats adjustably connected to said hull and wheels having hinged connections with said floats and said wing, said floats constituting the sole supporting means between said hull and said wheels.

3. An airplane having a hull, a wing associated therewith and means for contributing to the support of said craft from the ground or upon water, said means including ground-engaging elements, means hinged to said hull and connected to said elements, constituting fore and aft and lateral bracing for said ground-engaging elements when the latter are in their functioning position, said means having float characteristics, means including a device yieldable in response to landing impacts associated with said ground-engaging elements and a part of the airplane, and mechanism for simultaneously changing the positions of said ground-engaging elements relative to said means of float characteristics, whereby the latter will function as lateral stabilizing floats when the airplane is on the water.

4. A monoplane having means for contributing to the support thereof from the ground or upon water, said means including laterally spaced landing wheels and a marine float of an airfoil section connected to each side of the fuselage below the wing, means interconnecting each wheel and the adjacent float and means for simultaneously changing the positions of said wheels relative to the respective floats to provide a wheeled undercarriage, braced fore and aft and laterally by said floats, for supporting the craft from the ground or to dispose said floats for functioning as lateral stabilizers when the craft is supported on water, said means being actuatable to adjust said floats to contribute lift to the structure when the monoplane is in the air.

5. An aircraft having a body conforming to the lines of a boat hull, a wing disposed transversely of said hull, a float having an airfoil section hinged to each side of said hull, a wheel hinged to the outer end of each float and a strut, embodying a yieldable device, connected to the outer end of each float and to said wing, the upper end of each of said struts being movable relatively to said wing for effecting an arcuate movement of the float to which said strut is connected.

6. An aircraft adapted to take off from and alight upon land or water, having a body conforming to the lines of a boat hull, a wing disposed transversely of said hull, a float having an airfoil section hinged to each side of said hull to rotate upon an axis parallel to the longitudinal axis of said body, a wheel having a hinge connection with the outer end of each float, whereby the float and the wheel connected thereto will be capable of relative arcuate movement, means fixed to said hinge connection and extending upwardly to said wing, said means embodying a yieldable joint, and means connected to said upwardly extending means and movable longitudinally of said wing for actuating said upwardly extending means to rotate said float upon its hinge axis and simultaneously effect a change in the disposition of the wheel connected thereto relative to the normal water line of the float.

7. An aircraft adapted to take off from and alight upon the ground or water, having a body conforming to the lines of a boat hull, a wing disposed transversely of said body, a float having an airfoil section hinged to each side of said body to rotate upon an axis parallel to the longitudinal axis of said body, an axle member carrying a wheel hinged to the outer end of each of said floats, whereby the float and the wheel connected thereto will be capable of relative movement, a strut attached to said axle member and extending upwardly to said wing, said strut embodying a yieldable device, and means connected to said strut and movable longitudinally within said wing to effect the movement of said strut and the simultaneous movement of said float and wheel to either of two relatively extreme positions, as may be predetermined, to permit said aircraft to alight upon land or water, said floats being adjustable to positions intermediate their extreme positions for imparting lateral stability to the craft under different load conditions when the latter is upon the water.

8. An amphibian aircraft having a main float, lateral stabilizing floats movably connected to said main float, wheels hinged to said lateral stabilizing floats, means actuatable in one direction for moving said latter floats to a downwardly inclined position and simultaneously disposing said wheels to project their tread portions to a horizontal plane below the lowest point of said main float for engagement with the ground, said means including an element connecting said wheels and said floats to yieldingly transmit landing impact forces in a substantially vertical plane to the wing intermediate of its tip and root, when said wheels are so projected, said means being oppositely actuatable to move said floats to a substantially horizontal flotation position and simultaneously raise the tread portions of said wheels above the normal water line of the floats, said element assuming a position for transmitting impact forces from said floats in a plane inclined from the vertical to a point adjacent the root of the wing.

9. An amphibian aircraft having a main float, lateral stabilizing floats hinged thereto for movement on an axis parallel to the longitudinal axis of said main float, axle members, each carrying a wheel, hinged to said stabilizing floats, a strut connected to each of said axle members and extending thereabove to the wing, and means connected to said struts and disposed within said wing for actuation longitudinally thereof to move said struts from a vertical position between the axle members and a point on the wing intermediate its tip and root to an oblique position between said axle members and a point adjacent the root of the wing and vice versa, the movement of said struts in one direction projecting said wheels for engagement with the ground, the movement of the struts in the reverse direction locating the stabilizing floats in functioning position relative to said main float.

ANTHONY H. G. FOKKER.
ALFRED A. GASSNER.